(12) United States Patent
Goodwin et al.

(10) Patent No.: US 6,218,966 B1
(45) Date of Patent: Apr. 17, 2001

(54) TACTILE FEEDBACK KEYBOARD

(75) Inventors: Joel Gerard Goodwin, Austin; Scott Harlan Isensee, Georgetown; Ricky Lee Poston; I-hsing Tsao, both of Austin, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/187,072

(22) Filed: Nov. 5, 1998

(51) Int. Cl.$^7$ .................................................. H03M 11/00
(52) U.S. Cl. .............................. 341/27; 341/20; 341/22; 345/168; 200/5 A; 310/339
(58) Field of Search ................................ 341/20, 22, 27; 200/5 A, 513, 512, 516; 310/319, 339, 14; 400/94; 708/136; 345/168

(56) References Cited

U.S. PATENT DOCUMENTS

| | | | |
|---|---|---|---|
| 3,816,826 | * | 6/1974 | Masuda .................................. 341/24 |
| 3,932,869 | * | 1/1976 | Kane ...................................... 341/27 |
| 4,334,280 | * | 6/1982 | McDonald ........................... 708/136 |
| 4,415,283 | * | 11/1983 | Smith ..................................... 400/94 |
| 4,899,631 | * | 2/1990 | Baker ...................................... 84/719 |
| 5,212,473 | * | 5/1993 | Louis .................................... 345/168 |
| 5,982,304 | * | 11/1999 | Selker .................................... 341/27 |
| 6,002,184 | * | 12/1999 | Delson ................................. 310/14 |
| 6,059,506 | * | 5/2000 | Kramer ................................... 414/5 |

\* cited by examiner

Primary Examiner—Michael Horabik
Assistant Examiner—Albert K. Wong
(74) Attorney, Agent, or Firm—Robert M. Carwell

(57) ABSTRACT

A key assembly includes a cover disposed over a transducer which is connected to a key acutator/interface disposed between the key transducer and a CPU. A tactile signal generator generates control signals from the CPU to activate the actuator/interface. The actuator/interface provides a signal appropriate to the particular transducer causing it to produce tactile feedback response to the key cover and user's touch. The key assembly may include a larger key cover disposed over a plurality of key transducers whereby the CPU causes texture and fine detail sensations variable over the key cover area by selective, variable actuation of the transducers. The end-user may thereby sense by physical contact with the large key cover electronically generated sensations of irregular surfaces or textures. Tactile profiles either user-specified or automatically invoked by a corresponding application vary the keyboard touch and feel as defined by the selected profile.

24 Claims, 3 Drawing Sheets

TACTILE FEEDBACK KEYBOARD

BACKGROUND OF THE INVENTION

1. Field of the Invention

The field of the invention relates to user input devices for use with computer systems and electronic devices, and, more particularly to keyboards providing improved feedback to end-users.

2. Background and Related Art

One form of keyboard or keypad which has gained in popularity over the years employs a flat, thin, semi-rigid membrane, typically fashioned of plastic, which covers a single switch or switch matrix. Alpha numeric words, messages, or symbols such as "on", "reset", etc. are usually printed on the upper surface area of the membrane as desired to convey information to the end-user. Upon the user depressing the membrane over this message area contacts are thereby activated of a corresponding switch lying in vertical registry under the membrane and the message corresponding to the switch.

Because of their numerous benefits, such keyboards and keypads may be found in a wide variety of products, ranging from computer keyboards and calculators to test instrumentation, and even coffee makers and microwave ovens. These benefits include the fact that the switch contents may be hermetically sealed by the membrane from deleterious environmental factors such as coffee spills, foreign objects, dirt and dust, and the like. Additionally, the membrane is easily printed upon to convey the desired information to the user relative to each switch's function. Moreover, it is highly versatile, light, thin, flexible and therefore easily portable, readily cleaned, inexpensive, and has fewer moving parts than conventional key designs which can become quite complex and mechanically unreliable.

However, such membrane keyboards and keys are not without their own unique problems, not the least of which is the fact that such membrane keys or keyboards have little or no tactile feedback to the end user. This results in part from the fact that the throw of the key is oftentimes measured in terms of tenths or hundredths of an inch. It is thus often difficult for the user to determine whether in fact a key has been successfully depressed, rendering such things as touch typing extremely difficult and necessitating audible feedback in the form of annoying key closure beeps or the like.

Accordingly, an improvement was highly desired for such keys and keyboards which could provide this missing tactile and sensory feedback to the end-user. Such an improvement was desired which would not sacrifice the aforementioned compactness and portability afforded by such keys and keypads.

Still further, an improvement was desired which would permit the easy adjustment to match user preference or requirements in a given application of the amount of key resistance and distance of key travel which might be required.

In an effort to address this problem, some membrane keyboards were provided with domed membranes providing a small amount of additional key throw and feel. However users generally did not find this innovation to be particularly effective in terms of the touch, nor did it afford the end-user an opportunity to make any customized adjustments to the fed and touch of the keyboard.

Yet another problem associated with modern keys, keyboards, and keypads is that even when some form of tactile feedback is provided, it is generally discrete in the sense that it does not vary in terms of the qualitative or quantitative degree of feedback afforded to the end-user. For example, in a conventional computer keyboard, the user may feel a distinct click as a key is depressed. However, that is the only feedback provided to the end-user—a feedback which is singular in its type and magnitude, and with no latitude for the user being able to vary the type or magnitude of such feedback. This is not to diminish the importance of this more typical type of user feedback in keyboard art. Actually, manufacturers have taken great pains to design into computer keyboards for example, a highly distinctive click or feel. This is so important that computer manufacturers have actually built into computers sound generators which provide an audible artificial clicking sound upon depression of keys so as to create the illusion for an end-user that he or she is typing on a particular high quality keyboard with a virtual feel, as a result of this sound, different from the actual physical characteristics of the keyboard being employed. This psycho-acoustic affect has been employed with marginal results even in membrane keyboards for example wherein they are typically more devoid of any distinctive feel than are conventional keyboards.

Nevertheless, notwithstanding these attempts to improve keyboards, as aforementioned a need nevertheless existed to improve the tactile and sensory feedback to the end-user of such keys, keypads, and keyboards. Yet an additional weakness in conventional keyboard technology in affording user feedback was that such feedback was typically limited only to relatively small keys roughly the size of the human fingertip. This thereby significantly limited the ability to provide a distributed and more rich feedback over a wider area as afforded by the instant invention.

SUMMARY OF THE INVENTION

A key assembly includes a key cover disposed over a key transducer which, in turn, is connected to a key actuator/interface disposed between the key transducer and a computer system. A tactile signal generator generates control signals from a CPU to activate the actuator/interface. The actuator/interface serves two purposes. First, it provides an energy signal appropriate to the particular key transducer so as to cause the transducer to produce a desired tactile response or motion which it imparts to the key cover and user's touch.

Secondly, it provides an appropriate interface between the transducer and the CPU and tactile generator. The CPU may receive feedback of the user's interaction with the key cover by means of motion of the key cover imparting energy to the transducer, which is transferred through the actuator/interface to the CPU. The feedback loop between the end-user and the CPU is closed by means of the CPU generating the control signals to cause the tactile generator to in turn generate control signals imparted to the interface, thereafter to the transducer, and ultimately to the key cover.

In this manner, the CPU senses user interaction with the key assembly through the key cover and may generate appropriate key cover motion, resistance, and other tactile responses to be imparted to the end-user, either ab initio or in response to the feedback provided to the CPU from end-user interaction with the key assembly. In one embodiment, the key assembly includes a larger key cover disposed over a plurality of key transducers. In this manner, the CPU may cause the sensation of textures and fine detail variable over the area of the larger key assembly by means of selective and variable actuation of the various plural key transducers associated with the larger key cover. Thus, for example, the end-user may thereby sense by physical contact with the larger key cover an electronically generated sensation of an irregular surface or texture as desired.

The foregoing and other objects, features and advantages of the invention will be apparent from the following more particular description of a preferred embodiment of the invention, as illustrated in the accompanying drawings wherein like reference numbers represent like parts of the invention.

DETAILED DESCRIPTION

Figure 1:
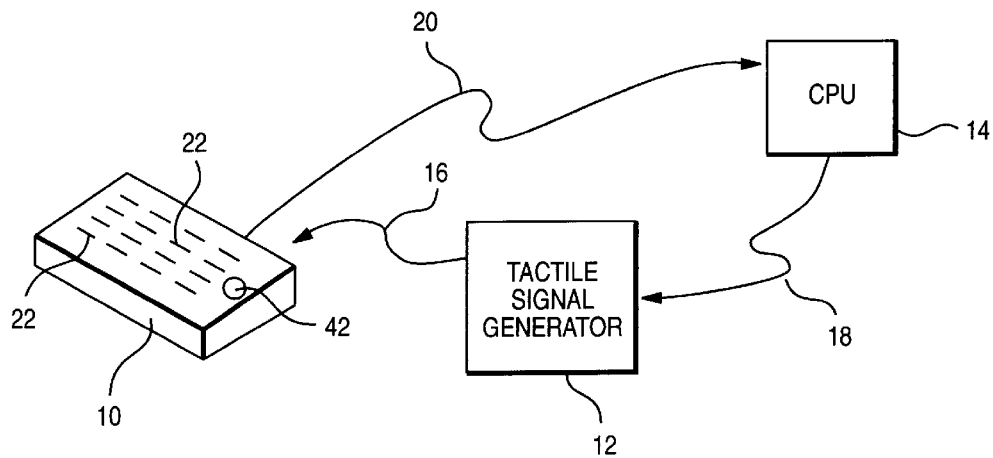
FIG. 1 is a pictorial illustration of a system employing the improved keyboard of the invention further detailed in FIGS. 2–7.

Turning to FIG. 1, depicted therein is a system employing the keyboard with improved tactile feedback in accordance with the invention. A keyboard 10 is shown therein having a plurality of key assemblies 22, a computer or CPU 14, and a tactile generator 12 for purposes to be hereinafter detailed. The CPU 14 is connected to the tactile generator 12 by the connection 18 and the tactile generator in turn is connected to the keyboard 10 by means of connection 16. In this manner signals may be generated by the CPU, transmitted to the tactile generator which in turn generates signals delivered to the keyboard for purposes to be hereinafter described on the link 16. Feedback signals originating from the various key assemblies 22 may be provided back to the CPU 14, thereby closing the feedback loop on the conductor 20. A key assembly 42 is for purposes of completeness also shown in the keyboard assembly 10, having a larger key surface area, again to be described in greater detail with reference to FIG. 7. Whereas a keyboard 10 has been depicted in FIG. 1 having a plurality of key assemblies 22, the invention is not intended to be so limited, and admits to applications wherein, for example, a single key assembly 22 in accordance with the invention is utilized.

Figure 2:
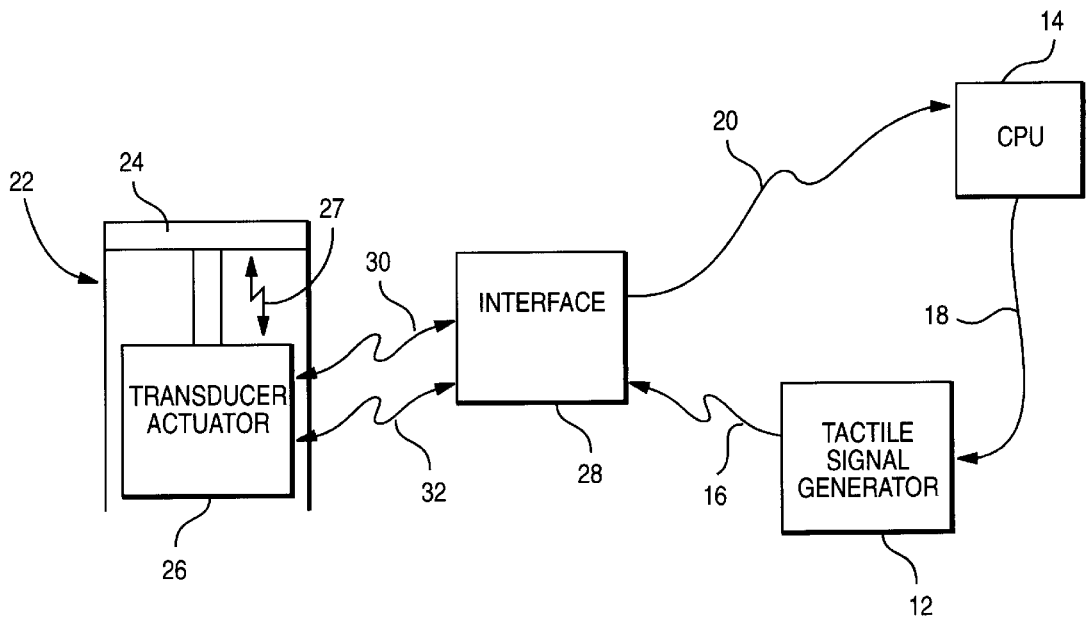
FIG. 2 is a functional block diagram further illustrating the system of FIG. 1 and a more detailed view of one of the keys in the keyboard of FIG. 1.

In FIG. 2, a hybrid diagram is provided which includes a simplified side view of one of the key assemblies 22 of FIG. 1 in conjunction with a functional block diagram of additional components of the key system of the invention which include the actuator/interface 28, tactile generator 12 and CPU 14 previously mentioned.

Directing attention to the key assembly 22 in more detail, each such key assembly is provided with a key cover 24 which may be of a membrane variety) which is functionally interconnected to a key transducer/actuator 26 which serves two purposes. First, the transducer 26 may impart motion as desired to the key cover 24. Alternatively, the transducer will receive motion from the key cover 24 which will be translated by the transducer 26 into a signal delivered on line 30 to the interface 28. The transducer may be activated by a signal on line 32 delivered to the transducer 26 which, in response, is energized and generates motion delivered to the key cover 24. This two-way interaction between the transducer 26 and key cover 24 wherein motion is imparted from the key cover 24 to the transducer 26 and alternatively from the transducer 26 to the key cover 24 is shown by the bi-directional arrow 27. It should be readily apparent that any alphanumeric, word, message, or symbol as desired may be disposed on the upper surface of the key assembly 24 so as to convey its function and purpose to the end-user. Moreover, it should further be readily apparent that the end-user will contact this upper surface of the key cover 24 by means of fingers, the palm of the hand, or the like so as to receive the sensory and tactile feedback from the invention as desired as well as to impart motion and thereby signals from the end-user to the system through the key cover 24 and transducer 26.

Continuing with FIG. 2, the purpose of the transducer interface 28 is to translate signals from the tactile generator 12 delivered to the interface 28 on line 16 into appropriate signals on line 32 which may be responded to by the transducer 26 and, conversely, to translate incoming signals from the transducer 26 on line 30 to the interface 28 into an appropriate signal to be delivered on line 20 to the CPU 14. It is a feature of the invention that it is not intended to be limited to any particular single form of transducer 26, but rather the invention admits to various forms of transducers 26 as appropriate. Thus, the interface 28 is depicted in a generic fashion in FIG. 2 in terms of its function in interfacing between the transducer on the one hand and the tactile generator and CPU on the other hand. In other words, the particular form of this interface 28 will vary dependent upon the characteristics of the specific transducer 26 employed, whether it be a solenoid type, electromagnetic type, muscle wire type, pneumatic type or any other such transducer 26 to be hereinafter described in greater detail with reference to FIGS. 3–7, respectively.

Figure 3:
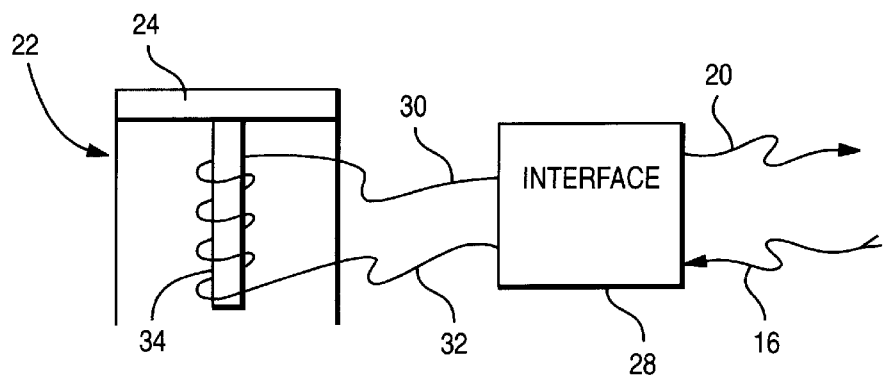
FIG. 3 is a side view of a key assembly with improved tactile feedback in accordance with the invention.

Turning to FIG. 3 now, a particular form of such a key assembly 22 is depicted therein employing an electromagnetic solenoid 34 as one form of the transducer 26. It will be noted that this solenoid 34 is interconnected to an interface 28 appropriate to the electromechanical characteristics of the solenoid 34 by means of the connections 30 and 32. In operation a signal 16 from the tactile generator 12 will be transformed as appropriate by the interface 28 and delivered on lines 30-32 to the solenoid 34 so as to cause vertical motion of the solenoid which is thereby imparted to the key cover 24 and ultimately to the end-user in contact with the upper surface of the key cover 24. In this manner, sensory and tactile feedback may be provided to the end-user in contact with the key cover 24 as desired in response to program control operating the CPU 14.

However, in keeping with the bi-directional nature of the feedback of the keyboard system of the invention, it will be readily appreciated that the solenoid 34 may also operate as a receiver transducer, translating motion imparted by the end-user on the key cover to the solenoid 34, which in turn will cause generation of signals on lines 30–32 to be delivered to the interface 28. In this manner, response from the end-user such as a key depression may be sensed by the assembly of FIG. 3, delivered from the solenoid 34 through the interface 28 on line 20 to the CPU 14 for further processing.

Figure 4:
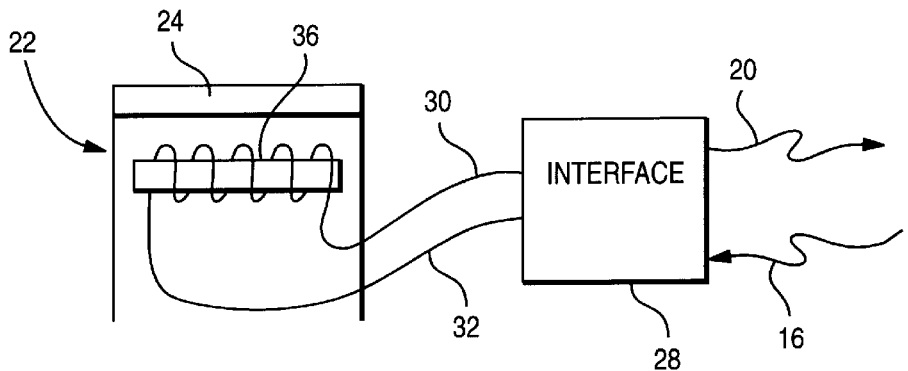
FIG. 4 is side view of another key assembly with improved tactile feedback in accordance with the invention.

FIG. 4 depicts an alternate embodiment of the key assembly of the invention. In this form, rather than a solenoid 34, an electromagnet 36 is substituted. However, operation is similar to that of the embodiment of FIG. 3, namely that the interface 28 upon delivering appropriate signals on lines 30–32 to the electromagnetic assembly 36 will cause it, in turn, to impart motion as desired to the key cover 24. Also, in like manner to the embodiment of FIG. 3, motion from the end-user imparted on the key cover 24 to the electromagnet assembly 36 will cause electrical signals on lines 30–32 generated by the assembly 36 to be delivered to the interface 28 and ultimately to the CPU 14 on line 20. Again, because of the different electromechanical characteristics between a solenoid 34 and electromagnetic assembly 36, it will be readily appreciated that the interface 28 of FIGS. 3 and 4 will differ as appropriate, but nevertheless will provide the same functional capability of interfacing a particular transducer 26 to the tactile generator 12 and CPU 14.

Figure 5:
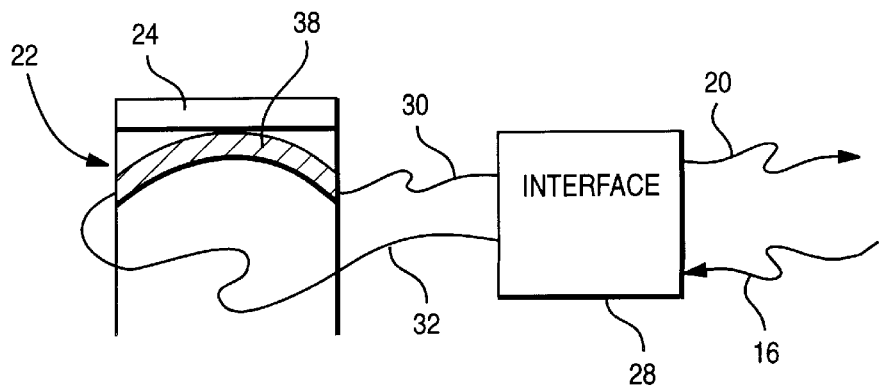
FIG. 5 is a side view of yet another key assembly with improved tactile feedback in accordance with the invention.

Turning now to FIG. 5, depicted therein is yet a further alternate embodiment of the key assembly 22 of FIG. 2. In this embodiment, a memory or "muscle" wire metal element 38 is employed to impart motion to and sense movement of the key cover 24. Such metals have the property that they will change shape when a voltage is applied to them. Thus, by imparting a potential difference across the leads 30–32 by means of the actuator/interface 28, the muscle wire element 38 may be caused to elongate or shorten, thereby imparting the desired upward or downward movement or key resistance or "touch" to the key cover 24.

Figure 6:
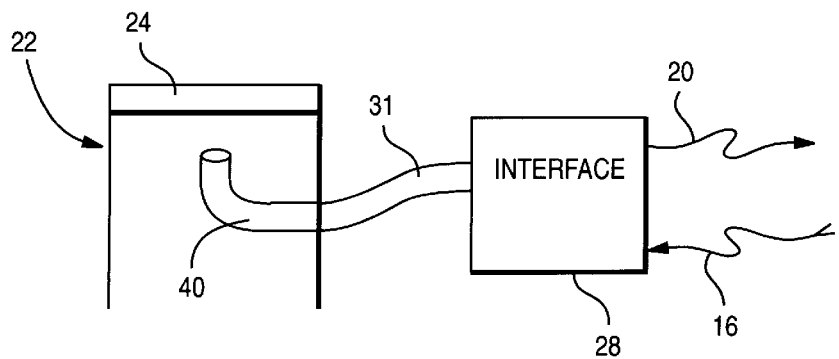
FIG. 6 is still another form of a key assembly with improved tactile feedback in accordance with the invention.

Referring now to FIG. 6, depicted therein is still a further alternate embodiment of the key assembly 22 of FIG. 2. In this case, a pneumatic element 40 is provided into an air chamber defined by the walls of the key assembly 22. In this embodiment, unlike the prior embodiments of FIGS. 3–5, actuation of the key cover 24 is by means of pneumatic pressure rather than due to electrical characteristics of the transducers 34, 36, 38. As a result, in this case the actuator/interface 28 is a means for generating and sensing pneumatic pressure either conveyed to or from the chamber defined by the walls of the key assembly 22. By altering the pressure from the actuator/interface delivered through the pneumatic element 40 into this chamber, the key cover 24 may be caused to deflect upwards or downwards as desired. Moreover, inasmuch as the interface 28 will also be adapted to sense pressure. end-user application of force on the key cover 24 will cause a correlative increase in pressure in the chamber conveyed by the element 40 to the interface 28 wherein it will be sensed and then conveyed as a key press or the like along line 20 to the CPU 14.

Referring now back to FIG. 1, it will be noted that a larger key assembly 42 may be desirably also be disposed in the keyboard 10 or provided alone. As previously described, in some instances it may be desirable to provide a larger tactile or sensory feedback area than a conventional keyboard key for enabling the end-user to sense a larger area by touch—either by means of rubbing a finger about the upper surface area defined by the larger key assembly 42, by placing multiple fingers on the key area or perhaps, even in some instances, a portion of the palm itself.

Figure 7:
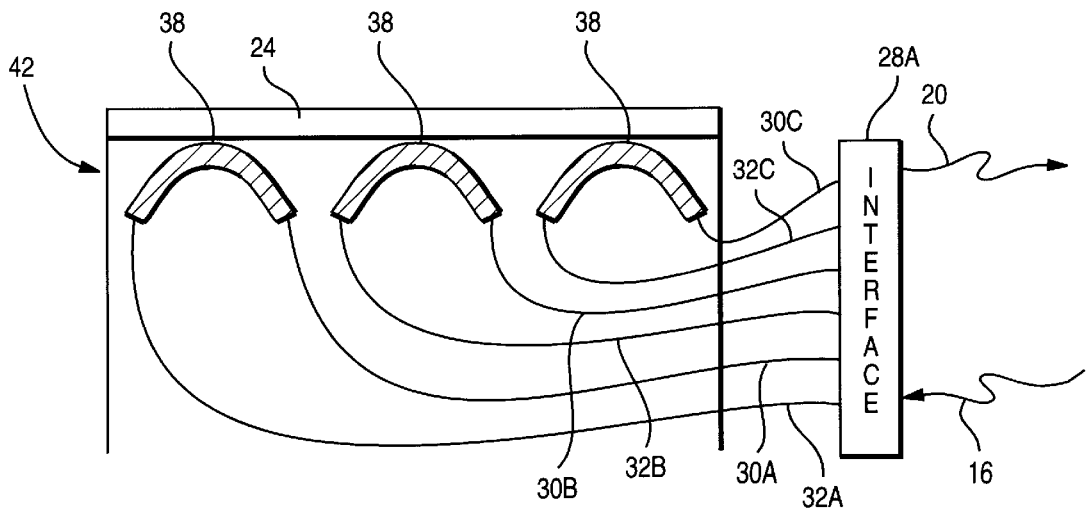
FIG. 7 is a side view of a key assembly of the invention wherein a larger tactile feedback area is provided.

Turning to FIG. 7, a highly simplified representative cross-section of a such a larger key assembly 42 is depicted therein. The familiar key cover 24 is shown, which, as before, may be of a membrane type, as well as, in this instance, a plurality of muscle wire transducers 38 (as was shown in FIG. 5), as well as an actuator/interface 28A, and the familiar connections 20 and 16 to and from the CPU 14 and tactile generator 12 of FIG. 2 as well as the multiple connections 30A–32A, 30B–32B, and 30C–32C between the respective muscle wire transducers 38 and the interface 28A. However, in this embodiment of FIG. 7 a few differences are exhibited. First, obviously the key cover 24 is of a larger surface area to permit greater interaction between it and the end-user. Moreover, a plurality of such muscle wire transducers 38 are shown. Although the illustration of FIG. 4 is merely a side view depicting three such transducers, it will be readily apparent that such individual transducers may be distributed as desired in any pattern of the area defined by the key cover 24. The interface 28A differs from those of the prior embodiments in that separate actuating and sensing mechanisms will be provided so as to permit alternatively the activation to or sensing from the respective transducers 38 independently of one another, so that motion imparted or sensed by each respective transducer will be independent of those of the other remaining transducers. In this manner, by selectively activating this plurality of transducers, various textures and feels may be simulated on the key cover 24 due to the multiple small tactile feedback areas. For example, by selectively activating certain of the transducers 38 in varying amplitudes and sequences, an irregular surface might be conveyed by the key cover 24 which may be flexible in the case of a membrane keyboard to thereby convey a rough or undulating surface or wave to the end-user.

It will be recalled that one of the benefits of a membrane keyboard is that it is very thin and can be rolled and folded, thereby becoming highly useful in portable keyboard applications. However., as also previously noted, one drawback to such keyboards is the lack of tactile feedback which can make touch typing difficult, for example. A feature of the embodiments of the key assemblies 22 shown in FIGS. 3–7 are that in an unactivated state, the key covers 24 may be caused in their ambient state to essentially lie flat with respect to the rest of the upper surface of the key assembly 10 of FIG. 1, thereby facilitating storage of the keyboard by rolling or folding it for example. In contrast, however, upon selective activation of the various transducers 26, these key covers 24 may be caused to extend upwards from the upper surface of the keyboard 10 so as to appear more like a conventional keyboard with raised keys and key throw, and the tactile feedback of key depressions. Thus, for example, in the embodiment of FIG. 6, with flexible key covers 24, a positive pressure exerted by the air transducer 40 will cause the key assembly to extend upwards in a dome shape so as to appear and feel more like conventional keys. However, upon reducing positive pressure in the chamber defined by the key assembly 22 in FIG. 6, these keys would thus become flat and in a condition so as to render the key assembly 10 in a thin, flat configuration suitable for storage by rolling, folding and the like wherein the keys would lie flat for storage. Obviously, activating the transducers of the other embodiments of FIGS. 3–5 as appropriate would, in like manner, present the key covers 24 in a more desirable configuration for interaction with the end-user wherein by activating the solenoid 34, electromagnetic assembly 36, or muscle wire transducer 38, again these corresponding key covers 24 would be raised in a position for contact with the user's digits.

In addition to providing for raised key covers 24 and for sensing the user's key depressions, these transducers 26 and specific embodiments thereof shown as transducers 34–38 have yet another advantage, namely that the degree of force exerted by them on the key cover is selectively variable as desired, responsive to signals from the interface 28 which in turn is responsive to signals from the tactile generator 12. In this manner, the user is able to selectively adjust the height of the keys, the key throw, and the predetermined amount of tactile resistance to keystroke based, for example, on the amount of air pressure delivered by the transducer 40, the electromotive force delivered by the solenoid 34, and the like. Thus, an additional benefit of the invention is to essentially provide for a customizable keypad or key assembly in terms of its mechanical characteristics and responsiveness to touch. An end-user might simply select a particular mechanical keyboard responsiveness profile designated to the CPU 14 which, in turn, would generate an appropriate signal 18 to the tactile generator 12 (FIG. 2), thereby changing the characteristics of the tactile generator 12 so as to generate the appropriate differing sets of signals 16 to the interface 28. These differing sets of signals to the interface 28 would thereafter be utilized by the interface to generate corresponding differing sets of signals 32 to the particular transducers 26, thereby selectively changing the tactile profile of the keyboard 10 as desired.

Moreover, in addition to manual profile selection or input from an end-user to the CPU 14 selecting a desirable keyboard profile, the CPU in the alternative may automatically select a profile which varies given the requirements of a particular application executing on the CPU 14. Thus, if the end-user invokes a word processing program through CPU 14, a keyboard profile would automatically be invoked to essentially place the keyboard 10 in a conventional keyboard mode with the tactile feedback associated with conventional keyboards. On the other hand, if the end-user was executing a different application such as one for selecting types of cloth, yet a different keyboard profile might automatically be invoked by the CPU 14—one which, in particular, for example, might activate the larger key assembly 42 so as to enable the end-user to sense a "virtual" cloth surface on the upper surface of key assembly 42, enabling the user to simulate the feel of the texture of various types of cloth.

As yet a further illustration of the versatility of the tactilely variable keyboard 10, differences in amplitude or frequency of key movements. in another embodiment, would be employed to differentiate between differing types of events such as alarms or other system events. It should also be appreciated that although in the embodiment of FIG. 1, a key assembly 10 is shown with a plurality of such keys, the invention may equally be applicable to an instance wherein even a single key assembly 22 is desired on a piece of equipment.

It should be readily apparent that although four alternate embodiments of the transducer 26 of FIG. 2 have been shown, the invention is not intended to be so limited. Accordingly, other forms of imparting motion to and sensing motion from the key assembly 24 are contemplated by the invention which may be embodied in another species of the generic transducer 26 of FIG. 2.

Similarly, with respect to FIG. 7, in the case of a larger key area 24 in plural transducers, although in this embodiment the muscle wire 38 form of transducers has been shown, this embodiment is not intended to be limited only to that particular type of transducer. Thus, for example, the invention contemplates substitution of other transducers 26 of FIG. 2 in the form of the key assembly 42 of FIG. 7 as desired and even various combinations of such differing transducers 26, depending upon the application and desired characteristics of the keyboard 10.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

What is claimed is:

1. A key assembly system for providing tactile feedback to a computer system and end-user, comprising:

at least one key assembly having
      a key cover;
      a transducer means in communication with said key cover for imparting motion to and sensing movement of said key cover,
      a tactile generator means for generating tactile simulation signals and;
      an actuator-interface means interconnected between said transducer means and said tactile generator means responsive to said tactile simulation signals for adapting said signals to the characteristics of said transducer means.

2. The apparatus of claim 1 wherein said transducer means comprises a plurality of independently actuatable transducers.

3. The apparatus of claim 1 wherein said transducer means is electrical and said motion is in response to electrical stimulation of said transducer means.

4. The apparatus of claim 1 wherein said transducer means is pneumatic.

5. The apparatus of claim 1 wherein said key cover is a flexible membrane.

6. The apparatus of claim 1 wherein key assembly system comprises:

a frame; and
   a plurality of said key assemblies carried by said frame to form a keyboard.

7. The apparatus of claim 1 wherein said at least one key assembly has associated therewith a plurality of tactile profiles; and wherein said system further includes a computer interconnected to said tactile generator means for storing and delivery to said tactile generator means a selected one of said plurality of tactile profiles; and
   wherein said tactile simulation signals are functionally related to said selected one of said plurality of profiles.

8. The apparatus of claim 7 wherein said selected one of said profiles is user-selected.

9. The apparatus of claim 7 wherein said computer is adapted to execute a plurality of applications; and said selected one of said profiles is automatically selected by said computer in functional correlation to a particular one of said applications executing on said computer.

10. A method for providing tactile feedback to a computer system and end-user, said system having at least one key assembly with a key cover and a transducer in communication with said key cover, said method comprising:

generating with said system at least one tactile signal;
   energizing at least one said transducer with said at least one tactile signal;
   conveying motion to said key cover from said at least one transducer in response to said energizing;
   detecting with said at least one transducer motion of said key cover;
   generating a signal by said transducer in response to said motion;
   transmitting said signal to said computer system;
   analyzing said signal with said computer system; and
   wherein said tactile signal is varied in response to said analyzing.

11. The method of claim 10 further including
storing a plurality of key profiles in said system; and
wherein said at least one tactile signal is varied as a function of one of said profiles.

12. The method of claim 11 wherein said profiles are user-selectable.

13. The method of claim 12 further including
executing an application on said computer system; and
selecting said one of said profiles automatically in response to said executing.

14. The method of claim 10 wherein said at least one tactile signal and said at least one transducer comprise a plurality of tactile signals and a plurality of transducers, respectively, and wherein said method includes communicating each of said tactile signals to a corresponding one of said transducers.

15. The method of claim 10 wherein said energizing is pneumatic.

16. The method of claim 10 wherein said energizing is electrical.

17. A program product executable on and for providing tactile feedback to a computer system and end-user, said system having at least one key assembly with a key cover and a transducer in communication with said key cover, said method comprising:
program code means for generating with said system at least one tactile signal;
program code means for pneumatically energizing at least one said transducer with said at least one tactile signal; and
program code means for conveying motion to said key cover from said at least one transducer in response to said energizing.

18. The program product of claim 17 further including
program code means for detecting with said at least one transducer motion of said key cover;
program code means for generating a signal by said transducer in response to said motion;
program code means for transmitting said signal to said computer system; and
program code means for analyzing said signal with said computer system.

19. The program product of claim 18 wherein said tactile signal is varied in response to said analyzing.

20. The program product of claim 17 further including
program code means for storing a plurality of key profiles in said system; and
wherein said at least one tactile signal is varied as a function of one of said profiles.

21. The program product of claim 20 wherein said profiles are user-selectable.

22. The program product of claim 21 further including
program code means for executing an application on said computer system; and
program code means for selecting said one of said profiles automatically in response to said executing.

23. The program product of claim 17 wherein said at least one tactile signal and said at least one transducer comprise a plurality of tactile signals and a plurality of transducers, respectively, and wherein said program product includes program code means for communicating each of said tactile signals to a corresponding one of said transducers.

24. The program product of claim 17 wherein said energizing is electrical.

* * * * *